United States Patent

Rudnick et al.

[11] Patent Number: 6,069,700
[45] Date of Patent: *May 30, 2000

[54] PORTABLE LASER DIGITIZING SYSTEM FOR LARGE PARTS

[75] Inventors: Fredrick C. Rudnick, Shoreline; Jeffrey M. Hansen, Renton; Charles M. Richards, Kent, all of Wash.

[73] Assignee: The Boeing Company, Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/904,225

[22] Filed: Jul. 31, 1997

[51] Int. Cl.$^7$ ........................................ G01B 9/02
[52] U.S. Cl. ................................ 356/359; 356/360
[58] Field of Search ............................. 356/359, 360

[56] References Cited

U.S. PATENT DOCUMENTS

| 4,621,926 | 11/1986 | Merry et al. ........................ 356/363 |
| 4,884,889 | 12/1989 | Beckwith, Jr. . |
| 4,892,407 | 1/1990 | McMurtry et al. . |
| 4,932,131 | 6/1990 | McMurtry et al. . |
| 5,130,523 | 7/1992 | Raleigh et al. . |
| 5,283,630 | 2/1994 | Yoshizumi . |

OTHER PUBLICATIONS

Hymarc Ltd., "Hyscan 3D Laser Digitizing Systems," Hymarc Flying Spot Technology, 1995.
Leica AG, "Smart 310," 3D Laser Tracking System—The Hardware, 1994.

*Primary Examiner*—Robert H. Kim
*Assistant Examiner*—Andrew Lee
*Attorney, Agent, or Firm*—Christensen O'Connor Johnson & Kindness PLLC

[57] ABSTRACT

A system for producing high accuracy surface scans of large and/or complex parts using a host machine such a machine for milling the part, a digitizing head attached to the host machine, and a remote laser tracking system for tracking the position of a retroreflector cube attached to the digitizing head.

17 Claims, 4 Drawing Sheets

PORTABLE LASER DIGITIZING SYSTEM FOR LARGE PARTS

FIELD OF THE INVENTION

The invention is directed to portable laser digitizing systems for producing high accuracy surface scans of large parts or parts with complex geometric shapes.

BACKGROUND OF THE INVENTION

Large items such as airplanes are constructed from master models. In modern times, parts for the items are designed on computer and the master models are made from the computerized data sets describing the surfaces of the items.

Before computers became commonly used, however, these master models were often plaster and plywood models made by hand. For instance, the Boeing Company, the assignee of the present invention, has many large plaster master models for airplane wings and other large parts stored in various warehouses across the country, thereby incurring expensive storage and maintenance costs. Since most or all of these were handmade master models, there are no data sets for the parts, and the parts must be reverse engineered in order to computerize the master models and thereby ensure against the consequences of the loss or damage to the master models. A portable, high-accuracy, digitizing system is needed so that surface maps of these handmade master models could be generated in situ, thereby avoiding the risk and expense of transporting large, irreplaceable parts to a scanning site. After a data set has been created and archived, the master model is no longer needed and may be destroyed, thereby eliminating the warehousing costs.

In addition to reverse engineering parts, digitizing systems are also used to inspect manufactured parts to ensure that they have been made within the required tolerances, for product design, and for tooling development.

Many devices exist for creating surface scans, and may be either contact or non-contact systems. Contact systems use a touch probe for directly measuring a part, or a laser measuring distance to a target placed in contact with the surface of a part to be measured. While contact systems are very accurate, resolution is limited by the size of the probe (typically a 3 millimeter (⅛th inch) ball) or target (e.g. a 38 millimeter (1.5 inch) retroreflector). Additionally, use of contact systems to measure parts having soft or non-rigid surfaces creates a danger of altering or deforming the surface being measured. Examples of contact systems include Coordinate Measurement Machines (CMM), Computer Aided Theodolites (CAT), and laser tracking systems.

Non-contact systems typically use lasers such as in laser digitizing heads, or other optical devices, and do not come into contact with the surface of the part being measured.

While many dimensional inspection devices exist, very few can accurately handle large parts or parts with complex geometric shapes with high resolution. Those that will handle large parts require expensive temperature and humidity controlled environments for maximum accuracy.

Coordinate Measurement Machines (CMM) such as the Chameleon and Xcel models manufactured by Brown & Sharpe of North Kingstown, R.I., the Delta, Bravo and Lambda models manufactured by DEA-Brown & Sharpe SpA of Torino, Italy, and the Bright series manufactured by Mitutoyo U.S. of Aurora, Ill. are common throughout the aerospace industry for dimensional inspection. They generally consist of a large granite block base and precision three axis motion actuators. To assure their accuracy, they are usually found in controlled environment chambers, and installed on floors that have been isolated from vibrations. CMM's use touch probes of known lengths and diameters that contact the part, and the X, Y, and Z axis positions are recorded for future reviewing. In addition to not being portable, problems with CMMs include high facilities and maintenance costs, mechanical limitations, and the fact that their accuracy is not assured with large parts because a slight temperature or humidity change is cumulative over the CMM work envelope.

Three and five axis mills are also used for mapping the surface of a part. The same style of touch probe used on the CMM's can be used on the mills to take measurements. When using a mill to measure a part, the touch probe is moved over the surface of the part by a human operator manipulating the controls of the mill Z offset data is collected by the touch probe, and the X, Y, and Z axis positions are obtained from the mill's internal mechanical position sensors (e.g. a certain number of motor rotations will equate to a known distance of movement). The problems with this system include the lack of portability and thermal inaccuracies of the CMM and, additionally, if the same machine that was used for machining the part is later used for measurement, inaccuracies in the mill may be hidden from the measurement if the machine and part to be measured are in the same relative positions. If the machine and part to be measured are not in the same relative positions, or if a different machine is used for measuring than was used during machining, inaccuracies in the mill can overemphasize errors, or report errors where none exist. In any case, there is no assurance of accurately measuring and recording part dimensional attributes.

Photogrammetry systems such as the models SD2000 and SD3000 manufactured by Leica AG of Heerbrugg, Switzerland, and the FotoG-FMS manufactured by Vexcel of Boulder, Colo., theodolites such as the models NA820, NA824, and NA828 manufactured by Leica AG of Heerbrugg, Switzerland and the model NT-4D manufactured by Nikon, USA of Melville, N.Y. and computer aided theodolites (CAT) such as the model T460 manufactured by Leica AG of Heerbrugg, Switzerland, the models GTS-500 and GTS-700 manufactured by Topcon of Tokyo, Japan, and the model DTM-400 manufactured by Nikon USA of Melville, N.Y. all utilize optical devices with a known relationship to triangulate the X, Y, and Z positions of targets placed on the part being inspected. All three systems are portable systems capable of measuring large and complex parts accurately, but they are time and labor consuming because of the necessity of laying out a large number of targets on the part, and the time to convert the data into a usable format. For instance, for a part having a thirty square foot surface, three days are generally required to lay out and measure a part using a six inch grid and to return the X, Y, Z data. Larger parts and/or smaller grids will take considerably more time.

The Hyscan laser digitizing head manufactured by Hymarc Ltd., of Ottawa, Ontario, Canada, is a non-contact system which is designed to be mounted onto a CMM, or some other translation device such as a mill. Measurement is performed by replacing the touch probe with the Hyscan digitizing head. Instead of using a touch probe to mechanically measure the distance to a point on the surface of the part being measured, the Hyscan uses a rastering laser beam and local triangulation to calculate offset values to the surface of the part being measured. The Hyscan laser scanner captures surface data at a continuous rate of 6,144 points per second with 0.025 millimeter (0.001 inch) accuracy. The data is acquired point-by-point using a swinging laser beam which scans back and forth in a pendulum-like motion and rapidly "paints" out the surface features in high resolution. This is done using a system of a synchronized moving mirror and precise triangulation techniques to calculate each point. The moving mirror sweeps the laser beam across the part. The beam is reflected from the surface of the part through a series of mirrors and a lens onto a Charged Coupled Device (CCD) array. The location on the CCD array that the reflected laser beam hits is translated into offset values which are combined with the host's internal X, Y, and Z coordinates to create a data set. While the Hyscan digitizing head collects high accuracy offset data in high resolution, it is dependent upon the CMM, or other translation device for overall accuracy and measurement envelope.

Robotic Vision Systems, Inc. (RVSI) of Hauppauge, N.Y. manufactures a three axis gantry with a non-contact split beam laser digitizing head. The head provides a Z-offset value that is added to the gantry's internal X, Y, and Z positions. Like the CMM's, the facility and maintenance costs are high because of the thermal inaccuracies, and like the Hyscan, the RVSI system is dependent upon the gantry's internal, mechanical, position sensors for accuracy.

In addition to dedicated scanning systems, 3-D laser tracking systems such as the Smart 310, manufactured by Leica AG of Heerbrugg, Switzerland, have been employed to scan parts. Laser tracking systems are high accuracy, but low resolution, contact systems that use a portable post mounted laser to follow and return position data of a retroreflector placed on the surface being scanned. Surfaces are measured by manually moving the retroreflector across the surface to be measured, thereby creating the possibility of human positioning errors reducing accuracy. Movement of the retroreflector is tracked by projecting a laser beam from the laser head to the retroreflector. The laser beam is reflected back to the laser head almost directly along its transmission path as long as the retroreflector does not move. When the retroreflector is moved, the laser beam no longer hits the optical center of the retroreflector. Instead, the retroreflector causes the reflected beam to follow a parallel path back to the laser head. The parallel offset between the transmitted and return laser beams is used to determine the distance and direction that the retroreflector has been moved. The parallel offset is determined at the position detector, which is a two-dimensional position sensitive photo diode within the measuring head. The parallel offset information is also used by the laser tracking system in order to point the laser beam back on the center of the retroreflector. The Smart 310 is capable of performing 1,000 such updates per second, thereby allowing continuous tracking of any path of retroreflector movement.

Surface scan measurements are made using an interferometer in the laser tracking system. As with all interferometers, no absolute distances can be determined. It is only possible to determine changes in distance because measurements are made by means of fringe counting. Therefore, in order to use a laser tracking system with an interferometer to measure absolute distances, measurements must always begin with the retroreflector positioned at a point to which the absolute distance is known. The interferometer fringe counting pulses are then added to or subtracted from this initial distance to obtain actual distance measurements. Since the laser tracking system requires the retroreflector for accuracy, the size of the retroreflector, which has a typical diameter of 38 millimeters (1.5 inches) or larger, limits the size of the surface detail which can be detected, i.e. changes in surface detail which are smaller than the retroreflector cannot be detected because the retroreflector cannot be fit in the surface detail.

None of the presently available dimensional inspection devices offers a combination of low cost, portability, high resolution, high-accuracy, and the ability to handle large parts or parts with complex geometric shapes. Thus, there exists a need for a dimensional inspection device that is portable and not time or labor consuming to set up, and that can handle large parts and/or parts with complex geometric shapes with high-accuracy and high resolution.

SUMMARY OF THE INVENTION

The present invention provides high resolution, high-accuracy surface scans of very large parts and/or parts with complex geometric shapes without having to resort to controlled environment chambers or extensive and time-consuming setup and calibration procedures by attaching a portable digitizing head to a host machine to scan the surface of the part in high resolution, while accurately tracking the location of the digitizing head using a portable laser tracking system as the digitizing head is moved across the surface of the part. High-accuracy data from the laser tracking system indicating the location of the digitizing head is merged with high resolution surface scan data from the digitizing head in order to create a high resolution, high-accuracy surface scan for the part.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
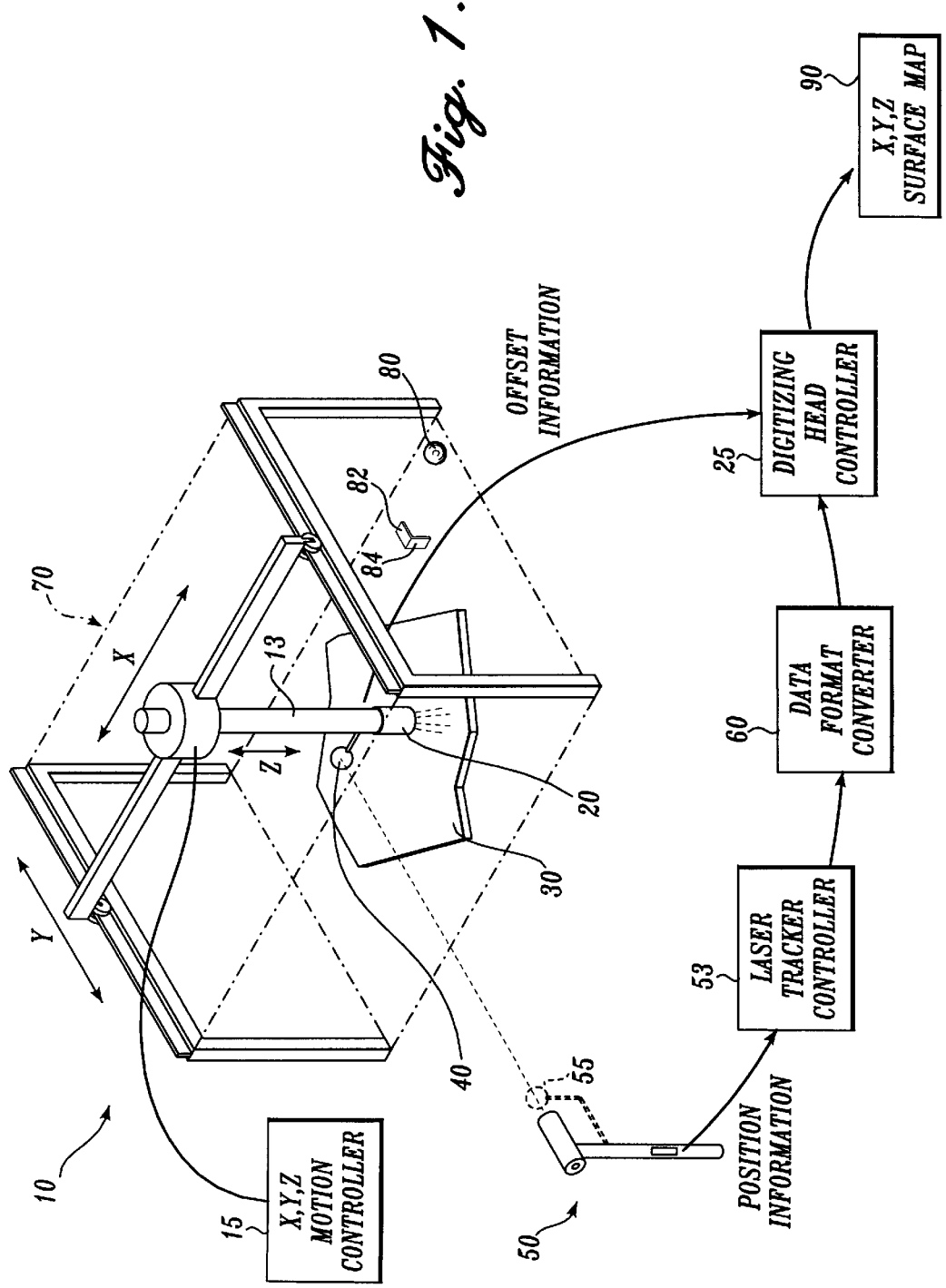
FIG. 1 is a schematic view of an apparatus according to the present invention.

Referring to FIG. 1, the present invention uses a host machine 10 to move a digitizing head 20 over the surface of a part 30 to be scanned. Attached to the digitizing head 20 is a retroreflector 40. A laser tracking system 50 tracks the position of the digitizing head 20 using a laser beam emitted by the laser tracking system 50 and reflected back from the retroreflector 40. Polar position data from the laser tracking system 50 are sent to a data format converter 60 which first converts the polar data into a Cartesian form, and then into an encoder data format used by digitizing head controller 25. Surface scan data from the digitizing head 20 sent to the digitizing head controller 25 are "merged" with position data from the data format converter 60 to create a high resolution and high-accuracy surface map of the part 30 being scanned.

In the preferred embodiment, the host machine 10 is a 95-foot five-axis router manufactured by Ingersoll Milling Machine Co. of Rockforn, Ill. but may be any device that can be used to position the digitizing head 20, and may range in size from railroad car-mounted platforms or larger, down to portable robotic arms; the host machine of the preferred embodiment has X and Y-axis carriages for positioning a vertical Z-axis support column 13 for the digitizing head 20. The preferred digitizing head 20 is a Model 25 Hyscan scanner available from Hymarc Ltd. of Ottawa, Ontario, Canada; and the laser tracking system 50 is the Smart 310 manufactured by Leica AG of Heerbrugg, Switzerland.

Figure 2:
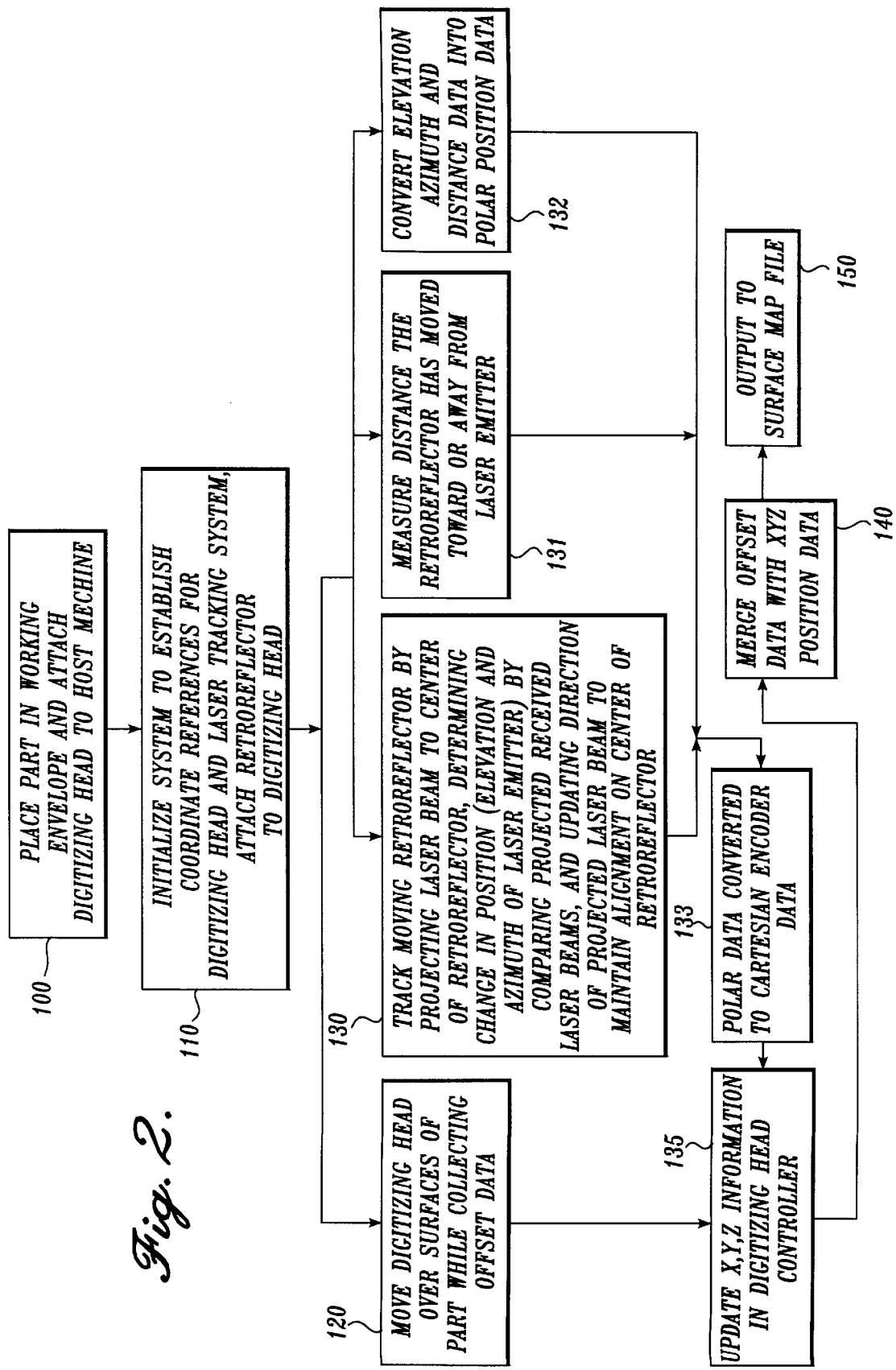
FIG. 2 is a flow diagram of a surface scanning process according to the present invention.

FIG. 2 depicts a typical surface scanning sequence of events. At step 100, the part to be scanned is placed within the working envelope 70, which is the volume of space in which the host machine 10 can position the digitizing head 20, and the digitizing head 20 is attached to the host machine 10.

At step 110, a common coordinate reference is established for the system. By scanning a reference target 80 (a perfect sphere having a three inch diameter in the preferred embodiment) located within the working envelope 70 with the digitizing head 20. In practice, only a portion of the sphere is scanned, and the remainder of the sphere is interpolated to determine the center, which is used to establish the 0, 0, 0 reference point or local home. Additionally, information indicating the X, Y, and Z-axis position is entered into the digitizing head controller 25 thereby establishing a coordinate system for the laser digitizing system of the present invention. Alternatively, horizontal and vertical reference targets 82 and 84 (FIG. 1), respectively, may be scanned in order to provide the digitizing head controller 25 with horizontal and vertical planes of reference, respectively. All position information sent to the digitizing head controller is automatically referenced to this common coordinate reference.

Figure 5:
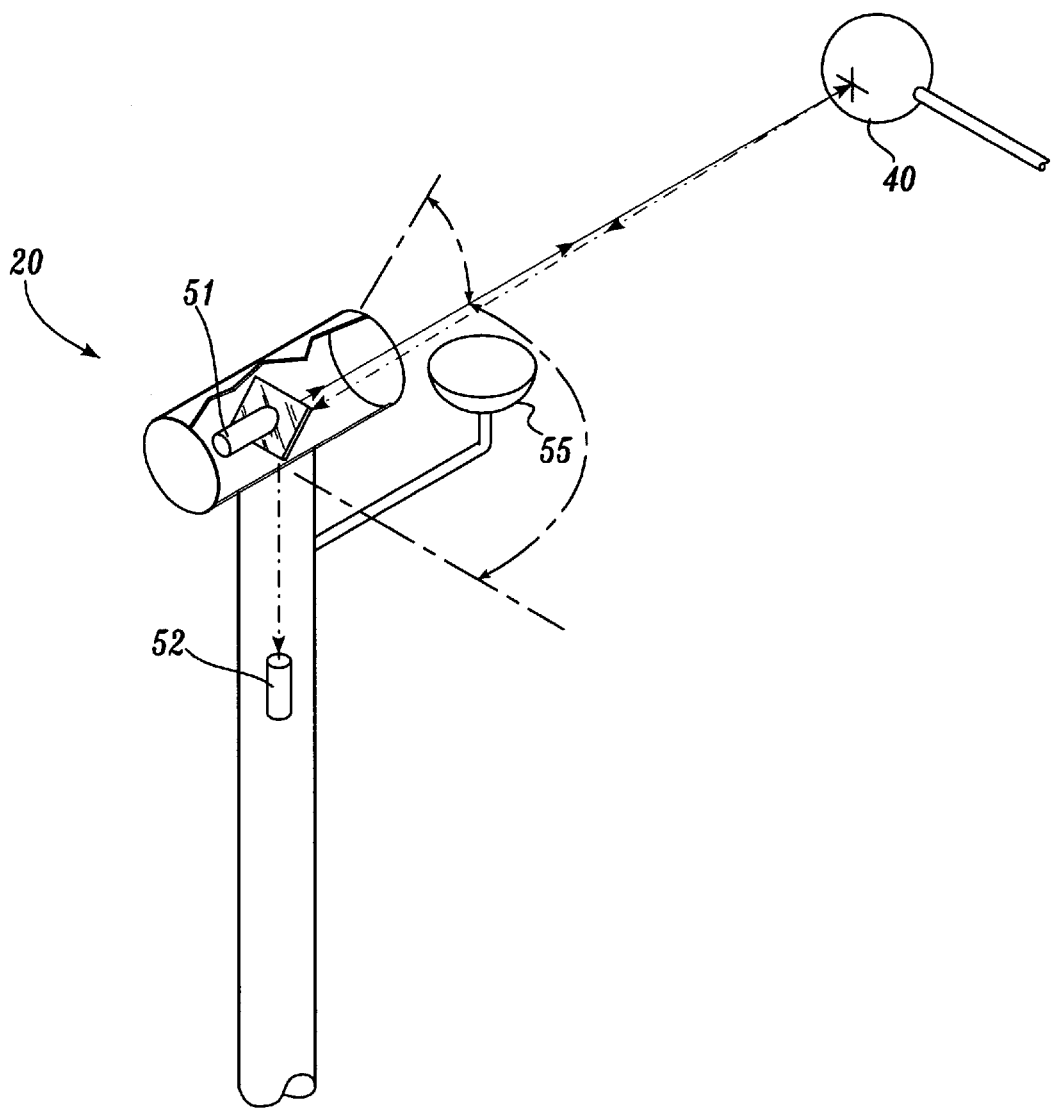
FIG. 5 is a schematic diagram of laser tracking system used in the preferred embodiment of the present invention.

Also at step 110, the laser tracking system 50 is initialized by placing the retroreflector 40 at a reference position 55 from the laser emitter of the laser tracking system and establishing a first distance reference by projecting a laser beam from the laser emitter 51 to the retroreflector 40 and receiving the reflected beam in an interferometer 52 in the laser tracking system 50 as represented in FIG. 5. After initialization, the retroreflector 40 is attached to the digitizing head 20 and movement of the digitizing head 20 is tracked by the interferometer and encoders, which measure the distance and angle the retroreflector has moved toward or away from the reference position 55. Those skilled in the art will recognize that distance determining devices other than an interferometer may be used to receive the reflected laser beam without departing from the spirit of the present invention.

Figure 3:
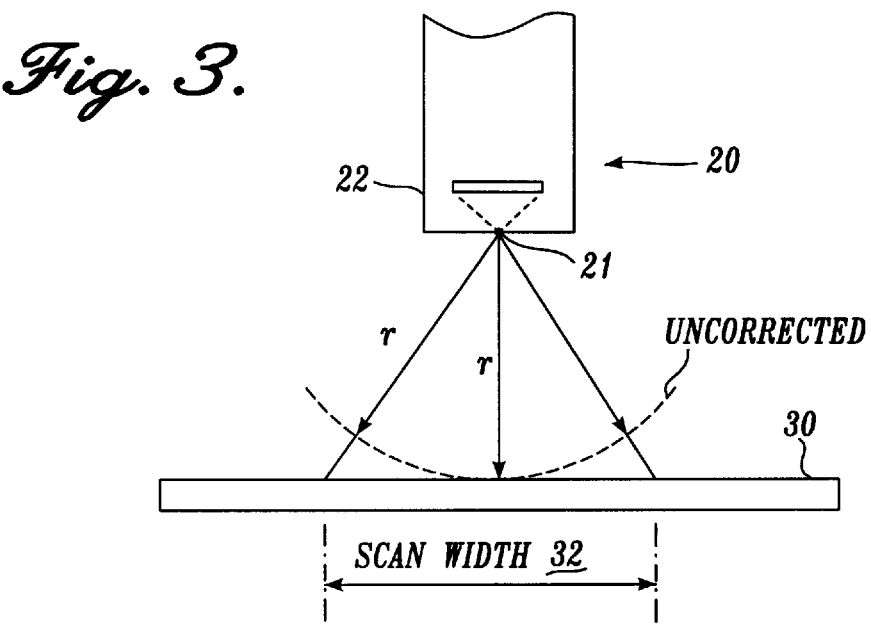
FIG. 3 is a schematic diagram of the digitizing head used in the preferred embodiment of the present invention.
Figure 4:
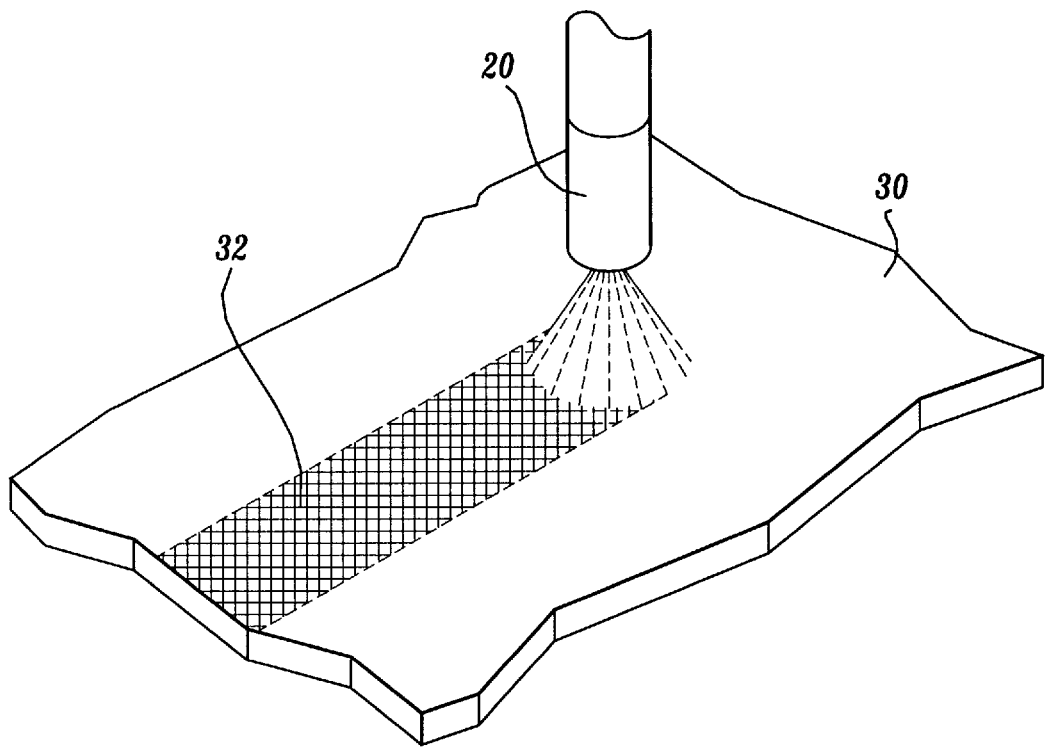
FIG. 4 is a fragmentary top perspective of the digitizing head of FIG. 3 scanning along the surface of a part.

Returning to FIG. 2, at step 120, an operator controls the scanning of a part by manipulating the host machine 10 to position the digitizing head 20 over the surface of the part 30 using a joystick or other positioning device. As shown in FIGS. 3 and 4, the digitizing head 20 includes a laser scanner 21 which continuously scans a 70 millimeter (2.8 inch) wide path 32 by swinging a laser beam back and forth in a pendulum-like motion as the digitizing head 20 is moved across the surface of the part 30. The laser beam is reflected back from the surface of the part 30 onto a Charge Coupled Device (CCD) array 22 in the digitizing head 20. The location on the CCD array that the reflected laser beam hits is calibrated to indicate the distance of the part to the digitizing head. Offset information is sent from the digitizing head 20 to the digitizing head controller 25.

Concurrent with step 120, at steps 130 to 132, the laser tracking system 50 tracks the position of the retroreflector 40 attached to the digitizing head 20 by projecting a laser beam from the laser emitter 51 to the center of the retroreflector 40, receiving a reflected beam back from the retroreflector 40, determining a change in the retroreflector's position by comparing the projected and received laser beams, and updating the direction (elevation and azimuth) of the laser emitter 51 in order to maintain alignment of the projected laser beam on the center of the retroreflector. While the laser tracking system 50 is tracking the movement of the retroreflector 40 at step 131, the interferometer 52 of the laser tracking system 50 is concurrently measuring the distance that the retroreflector 40 has moved toward or away from the laser emitter 51, and at step 132, converting the elevation, azimuth, and distance data into polar position data representing the location of the retroreflector 40. The laser tracker controller 53 utilizes encoders to determine laser emitter's elevation and azimuth. The distance to the digitizing head 20 is encoded as an interferometer reading. The laser tracker controller 53 converts the elevation, azimuth and distance information into three-dimensional polar coordinates using any common conversion method. The laser tracker controller 53 of the preferred embodiment is a personal computer running software to encode for the elevation and azimuth of the laser beam, and for distance information from the interferometer, and outputs the elevation, azimuth, and distance information as polar coordinates. The personal computer is equipped with connectors to receive data from the laser tracking system 50 and for outputting data to the data format converter 60. Those skilled in the art will readily recognize that a dedicated black box or any other means for performing the required functions of the laser tracker controller could be employed without departing from the spirit of the present invention.

At step 133, the polar position data is sent from the laser tracker controller 53 to the data format converter 60 where it is converted into an encoder format suitable for the digitizing head controller 25. In the preferred embodiment, the data format converter is implemented as a board for a personal computer, which has connectors to receive a cable from a laser tracker controller and to output data to the digitizing head controller 25, and includes hardware circuitry to convert the polar coordinated data to Cartesian coordinate data, and then to an encoder format for the digitizing head controller. It should be noted, however, that the data format converter 60 could also be implemented as a dedicated black box including the necessary connectors and hardware or with a single-board computer having the necessary connectors and either firmware or software to perform the necessary conversions, or entirely in software running on a personal computer equipped with the necessary connectors, or as any other means for receiving data from the laser tracker controller 52, performing the necessary conversions, and outputting the data to the digitizing head controller 25 without departing from the spirit of the present invention.

The polar position data from the laser tracker controller 52 are fed to the data format converter 60 which converts, in real-time, the polar data into Cartesian coordinates, using any common conversion method and then to an encoder data format suitable for the digitizing head controller 25, where the encoder data updates X, Y, and Z information in the digitizing head controller 25.

At step 140, encoder data from the data format converter 60 is continuously updating X, Y, and Z information in the digitizing head controller 25 to represent the current position of the retroreflector 40. Concurrent with the updating of the X, Y, and Z information in the digitizing head controller 25, the digitizing head 20 is sending offset data concerning the surface of the part 30 being measured to the digitizing head controller 25. The digitizing head controller 25 receives offset data from the surface of the part 30, as well as offset information relating to the position of the swinging laser beam. Because the laser scanner in the digitizing head 20 scans by swinging the laser beam back and forth in a pendulum-like motion, points lying near the ends of the scan window are offset from points near the center of the window. Thus if the digitizing head is moved along a single axis, then offsets for the axis perpendicular to the axis of motion are required. If the digitizing head is moved diagonally, then offsets for both axes will be needed. The digitizing head controller 25 automatically corrects for these offsets using a common mathematical algorithm. By way of example, if the digitizing head 20 is scanning along the X axis, the digitizing head controller 25 automatically provides correction for the Y and Z offsets. To illustrate this need for correction, if the digitizing head 20 were scanning along the centerline of a semicircular channel, the semicircular channel otherwise would appear as a flat surface because all points of the channel would be equidistant from the point of beam emission of the digitizing head.

As each set of offset data is received from the digitizing head 20, the X, Y and Z information in the digitizing head controller 25 is read and merged with the incoming offset data to form an element of the surface map for the part 30. At step 150, the surface map data is output to a surface map file 90. After the part 30 has been completely scanned, the subsequent surface map file 90 may be displayed on a graphics work station, or used for product development, tooling design, quality assurance, or any other purpose in which surface maps are employed. Since the retroreflector 40 and the digitizing head 20 are always in the same relative positions, information representing the position of the retroreflector 40 also represents the position of the digitizing head 20.

In the preferred embodiment, the digitizing head controller 25 is implemented as a graphics work station having a connector for accepting encoder format data from the data format converter 60 and a connector for accepting offset information from the digitizing head 20. Additionally, the digitizing head controller 25 includes a software program implementing an algorithm to merge the offset information from the digitizing head 20 with X Y, and Z position data from the data format converter 60. Those skilled in the art will recognize that a personal computer or any other means for merging data from the data format converter 60 and the digitizing head 20 into a surface map file may be employed without departing from the spirit of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A portable digitizing system for producing high accuracy surface scans of large or complex parts, the digitizing system comprising:

a host machine having a support member movable through a plurality of axes of motion, the plurality of axes of motion defining a three-dimensional working envelope within which the support member is movable, the host machine including a motion controller for controlling movement of the support member within the three-dimensional working envelope;

a digitizing head mounted on the support member for scanning a surface of the part and for collecting data about the scanned surface into a Z-offset dataset representing distances from the surface to the digitizing head, wherein the digitizing head is attached to and moveable along the plurality of axes of motion within the three-dimensional, working envelope by the host machine, the Z-offset dataset being collected without reference to the motion controller of the host machine;

a position sensor, separate from the host machine, for tracking the motion of the digitizing head, the position sensor further for collecting location information concerning the digitizing head into a location dataset representing positions of the digitizing head relative to the position sensor, the location dataset being collected without reference to the motion controller of the host machine; and a separate controller for combining the Z-offset dataset from the digitizing head with the location dataset from the position sensor to create a high accuracy surface map dataset of the part being scanned without reference to operation of the host machine or the motion controller thereof.

2. The system of claim 1, wherein the digitizing head further comprises a laser scanner for collecting Z-offset information from one or more surface locations at each digitizing head location.

3. The system of claim 1, wherein the position sensor further comprises a laser tracking system having a laser emitter and receiver unit located outside of the working envelope, and a retroreflector attached to the digitizing head.

4. The system of claim 3, wherein the laser emitter and receiver unit is a portable post mounted laser with interferometer.

5. The system of claim 3, wherein the laser tracking system tracks the motion of the digitizing head with a laser beam emitted from the laser emitter which is reflected back to the laser receiver from the retroreflector.

6. The system of claim 5, wherein the laser receiver is an interferometer.

7. The system of claim 5, wherein the position sensor collects data representing the position of the retroreflector relative to the laser emitter and receiver unit.

8. The system of claim 7, wherein the digitizing head further comprises a laser scanner.

9. The system of claim 8, wherein the laser scanner scans a surface using the laser beam by sweeping the laser beam across a predetermined window.

10. The system of claim 1, wherein the position information from the laser tracking system is offset to account for the relative position of the retroreflector to the laser scanner.

11. The system of claim 1, wherein the digitizing head further comprises a laser scanner.

12. The system of claim 11, wherein the laser scanner scans a surface using the laser beam by sweeping the laser beam across a predetermined window.

13. The system of claim 12, wherein the laser scanner collects a stream of Z-offset data representing the distances of points in the scanned window of surface to the laser scanner of the digitizing head.

14. A method for producing high accuracy surface scans of large or complex parts from data collected using a digitizing head attached to a host machine, the host machine having a plurality of axes of motion which define a working envelope in which the digitizing head may move, the method comprising the steps of:

placing the part to be scanned within the working envelope;

scanning the part to collect Z-offset data representing the distance of a surface of the part to the digitizing head by moving the digitizing head across the surface to be scanned with the host machine;

creating a Z-offset dataset from the collected Z-offset data;

tracking the digitizing head and collecting data representing locations of the digitizing head as it moves within the working envelope using a position sensor separate from the host machine, the position sensor located outside the working envelope;

creating a location dataset from the collected location data; and creating a high accuracy surface map dataset for the part by combining the Z-offset dataset from the digitizing head with location dataset from the position sensor.

15. The method of claim 14, wherein the position sensor is a laser tracking system, the method further comprising the step of attaching a retroreflector to the digitizing head.

16. The method of claim 15, wherein the step of tracking and collecting data representing the location of the digitizing head further comprises the steps of:

projecting a laser beam from a laser emitter of the laser tracking system to the retroreflector attached to the digitizing head;

receiving a reflected laser beam from the retroreflector by a laser receiver of the laser tracking system;

comparing the received laser beam with the projected laser beam to determine the location and direction of motion of the digitizing head; and adjusting the direction of the projected laser beam to follow the retroreflector as it moves with the digitizing head based on the determined direction of motion information.

17. The method of claim 15, wherein digitizing head further comprises a laser scanner, and wherein the step of scanning the part to collect Z-offset data further comprises the step of sweeping the laser scanner across at least one location on the surface to be scanned for each location of the digitizing head.

* * * * *